United States Patent [19]

Hunziker

[11] 3,931,986

[45] Jan. 13, 1976

[54] REMOVABLE JACKING WHEEL UNIT

[76] Inventor: Louis A. Hunziker, 783 Commerce Ave., Longview, Wash. 98632

[22] Filed: Dec. 13, 1974

[21] Appl. No.: 532,369

Related U.S. Application Data

[62] Division of Ser. No. 407,988, Oct. 19, 1973, Pat. No. 3,880,310.

[52] U.S. Cl. .................. 280/43.2; 214/390; 254/7 R
[51] Int. Cl.² .......................................... B60P 1/02
[58] Field of Search ............ 280/43.2, 43.22, 43.17; 214/390, 512; 254/7 R

[56] References Cited
UNITED STATES PATENTS

| | | | |
|---|---|---|---|
| 1,343,650 | 6/1920 | Snyder | 280/43.2 X |
| 3,145,863 | 8/1964 | Dunaski | 214/390 |
| 3,506,147 | 4/1970 | Wenger et al. | 214/390 |
| 3,534,880 | 10/1970 | Washburn et al. | 214/390 |

*Primary Examiner*—Robert R. Song
*Assistant Examiner*—John A. Pekar
*Attorney, Agent, or Firm*—Lee R. Schermerhorn

[57] ABSTRACT

Large objects which are difficult to handle, such as 14 to 26 foot boats, are secured to a base frame for shipment from the manufacturer to the dealer. The dealer attaches jacking wheel units converting the base frame into a dolly which may be readily wheeled into the dealer's show room or into a display area in a boat show. The base frame remains with the boat as a pallet until it is launched, supporting the boat substantially at floor level for most effective display. The wheel units are attached only for movement into or out of a display area or the like and are then removed for use on another base frame and boat.

5 Claims, 6 Drawing Figures

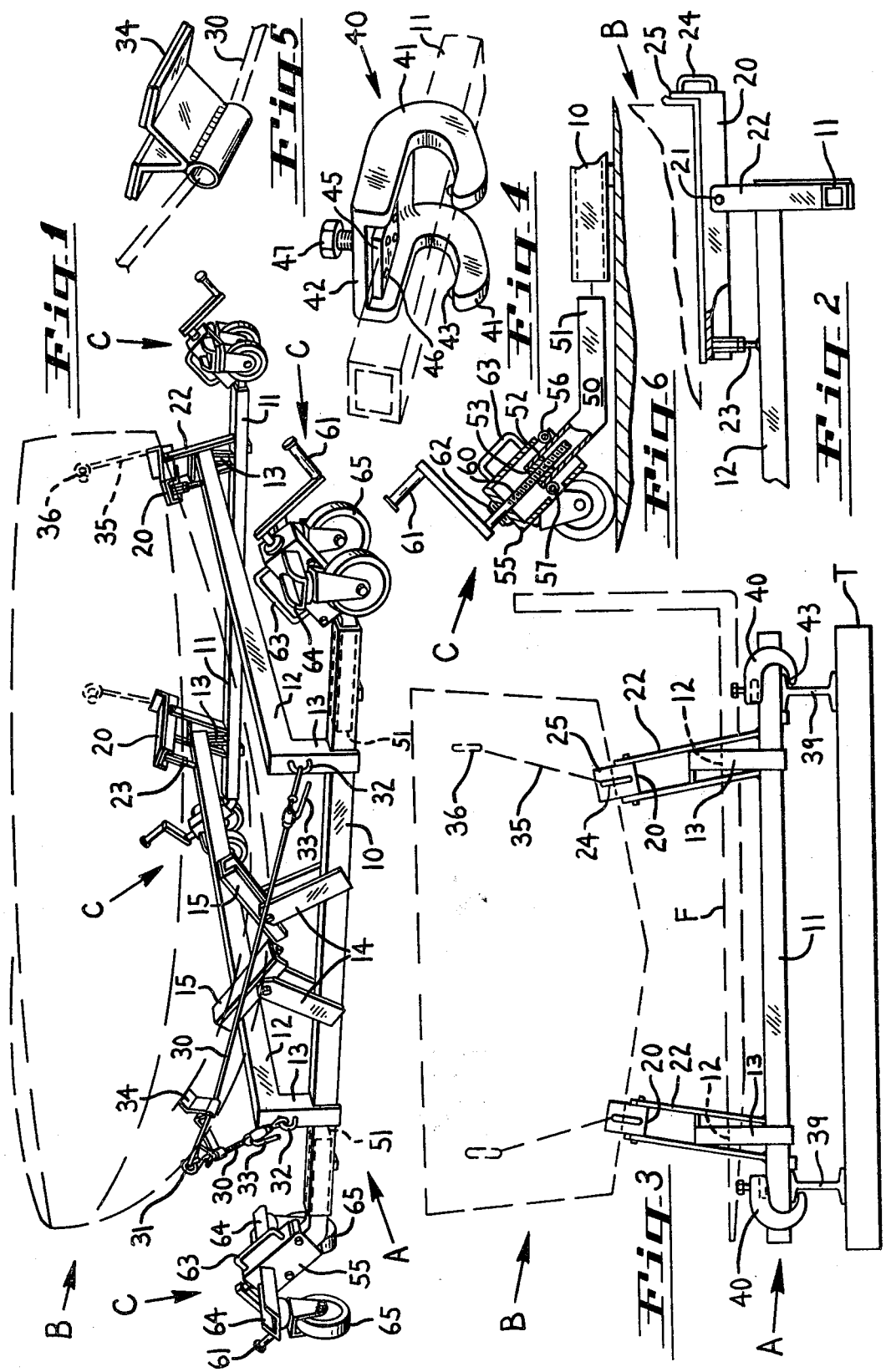

REMOVABLE JACKING WHEEL UNIT

CROSS-REFERENCE TO RELATED APPLICATION

This application is a division of application Ser. No. 407,988, filed Oct. 19, 1973, for Dolly With Removable Jacking Wheel Units, now U.S. Pat. No. 3,880,310.

BACKGROUND OF THE INVENTION

This invention relates to removable jacking wheel units for moving and displaying heavy objects, such as boats.

For example, 14 to 26 foot boats weighing from 1000 to 4000 pounds are usually shipped from the manufacturer to various dealers on highway cargo trailers. When the boat arrives at its destination, the dealer, according to conventional practice, must have available a crew of workmen to unload the boats either by fork lift or slings and a crane. There must also be available a boat trailer of appropriate size for each boat or some other means for supporting the boats after they have been lifted off the trailer.

If the dealer does not have a work crew and the right combination of boat trailers immediately available, there is confusion and loss of time in the unloading procedure adding to the expense and inconvenience of the dealer as well as the highway trucker whose departure is delayed.

More tedious work is required to get the boats on display in the dealer's show room. Automobile boat trailers are not favored for display purposes because of the height of the mounting and the valuable space occupied by the trailer. So, again, the boat must be unloaded by some means and placed on some suitable support that does not detract from the display of the boat. When a boat is to be displayed in a boat show, the dealer faces the same problems all over again, an automobile boat trailer usually being an undesirable support for display of a boat in a boat show.

Objects of the invention are, therefore, to provide improved apparatus for facilitating the shipment, handling and display of heavy objects such as boats, to provide conveniently attachable and removable wheels to convert a pallet into a dolly, and to provide an improved attachable wheel unit having jacking means to raise a dolly frame or other structure off the floor.

SUMMARY OF THE INVENTION

In general, the present device comprises a dolly frame having removable jacking wheel units. When applied to boats, the dolly frame is secured to the boat by the manufacturer and remains with the boat as a pallet until the boat is launched. Special clamps are provided for securing the dolly frame as a pallet to highway trailers or other transportation vehicles for shipment without resorting to the usual insecure blocking and rope or strap bindings.

When the shipment arrives at the dealer's premises, the boats and dolly frames are lifted off the transportation vehicle by a lift truck or crane and sling and set on the ground or pavement. Wheel units equipped with jacks are inserted in the dolly frame and the frame is lifted by the jacks sufficiently to permit the boat to be wheeled into the dealer's show room. Then the wheel units are removed, leaving the boat on display substantially at floor level on the inconspicuous dolly frame. By merely inserting the wheel units, the boats may be shifted about on the display floor from time to time as desired with very little effort. When a boat is to be displayed in a boat show, the foregoing operations are repeated, requiring usually only a lift truck and a highway cargo trailer, with a minimum of manpower.

The invention will be better understood and the foregoing and other objects and advantages will become apparent from the following description of the preferred embodiment illustrated on the accompanying drawing. Various changes may be made in the details of construction and arrangement of parts and certain features may be used without others. All such modifications within the scope of the appended claims are included in the invention. Although the invention is illustrated and described in connection with the shipment, handling and display of boats by way of example, the broader aspects of the invention are not limited to any particular type of goods or merchandise.

BRIEF DESCRIPTION OF THE DRAWINGS

FIG. 1 is a perspective view of an apparatus embodying the invention, showing wheel units attached to a dolly frame for a boat;

FIG. 2 is a fragmentary side elevation view, with parts broken away, showing an adjustable bottom rest for the stern of a boat on the dolly frame;

FIG. 3 is a rear elevation view of the dolly frame showing special clamps for securing the dolly frame as a pallet to I-beams on a highway cargo trailer;

FIG. 4 is a perspective view of one of the special clamps in FIG. 3;

FIG. 5 is a perspective view of a cable guide which secures the bow of the boat to the dolly frame in FIG. 1; and FIG. 6 is an elevation view, with parts broken away, showing one of the wheel units in FIG. 1.

DESCRIPTION OF THE PREFERRED EMBODIMENT

As illustrated in FIG. 1, the dolly comprises a frame A supporting the boat B and equipped with four removable wheel units C. Frame A comprises, essentially, a pair of square tubular cross member beams 10 and 11 and a pair of square tubular longitudinal member beams 12. Longitudinal members 12 have upright end portions 13 welded to the cross members 10 and 11.

When wheel units C are removed, the cross members 10 and 11 are adapted to rest on the floor and longitudinal members 12 are spaced above the floor to permit a lift truck fork F to pass under the longitudinal members as shown in FIG. 3. Thus, frame A and boat B are adapted to be picked up as a pallet load by a lift truck approaching from the side, or by a crane equipped with slings.

Frame A may be adapted to support various types of objects. For carrying a boat, the front cross member 10 has brackets 14 equipped with rests 15 forming a V-shaped cradle to support the bow of the boat. At the stern, a longitudinal rest 20 is pivotally mounted on a pivot pin 21 on an upright 22 at the end of each longitudinal member 12. The rests 20 adjust themselves on pivots 21 to the angles of the bottom of the boat, the front end of each rest having an adjustable length strut 23 connected with the adjacent longitudinal member 12. The back end of each rest 20 is equipped with a handle loop 24 on an upstanding abutment 25 which engages behind the transom of the boat.

The boat B is secured to frame A by suitable tie-down means for shipment. For example, at the bow a pair of chains or cables 30 are connected between an eyebolt 31 and a pair of U-bolts 32 on the front uprights 13. These connections may be made at other points on the frame A depending on the size and the shape of the boat. The chains or cables 30 are tensioned by lever tighteners 33 and held spaced away from the bottom of the boat by V-shaped spacers 34. At the stern similar chains or cables 35 are tensioned between handles 24 and eyebolts 36 in the transom.

FIG. 3 shows how the boat B and frame A with wheel units C removed are deposited on a highway cargo trailer T for shipment. The lift truck fork F engaged under longitudinal frame members 12 lowers the frame and boat causing cross members 10 and 11 to rest on a pair of longitudinal I-beams 39 on the trailer. The cross members 10 and 11 are secured to the I-beams by special clamps 40. Thus, the frame A is rigidly secured at four points to the trailer T by the clamps 40 and the boat is securely fastened at the four points 24, 24, 32, 32 to the frame A for long distance and high speed travel. Dolly frame A serves as a pallet.

As shown in FIG. 4, each clamp 40 comprises a pair of C-shaped side members 41 which are integral with opposite sides of a flat top intermediate portion 42. Side members 41 straddle the frame cross member 10 or 11 and their lower ends are equipped with hardened protrusions 43 with bite into the under side of the top flange of I-beam 39 to prevent slippage. A clamp plate 45 is equipped with similar hardened protrusions 46 to bite into the top surface of cross member 10 or 11. Clamp plate 45 is swivel mounted on the lower end of a screw 47 which has threaded engagement with a tapped hole in top plate 42. By tightening the screw 47 with a wrench, the plate 45 and protrusions 46 are forced downward against the top surface of cross member 10 or 11 and the protrusions 43 are pulled upward against the under surface of the top flange of the I-beam as shown.

When the boat reaches its destination, clamps 40 are removed and the boat B and frame A are lifted off the trailer T by a lift truck fork F as shown in FIG. 3 or by a crane and sling. Then the boat and frame A are lowered until cross members 10 and 11 rest on the floor or pavement. Next, a wheel unit C is inserted in each end of each cross member 10 and 11 on the periphery of frame A as shown in FIGS. 1 and 6.

Each wheel unit C comprises a bent arm 50 having a lower horizontal end 51 and an upper inclined end 52, the end 51 being insertable into the socket opening in a cross member 10 or 11 while the latter is resting on the floor. A nut 53 is welded in the upper extremity of inclined end 52. End 52 extends into a jack housing 55 and bears against an upper roller 56 and a lower roller 57. A screw 60 engages the nut 53 and is equipped with a crank handle 61 and a bearing 62 engaging the upper end of housing 55 as shown. Preferably, the upper end 52 of arm 50 makes an angle of about 135° with respect to lower end 51. Housing 55 is equipped with a carrying handle 63.

A pair of outstanding cross members 64 on opposite sides of housing 55 is equipped with caster wheels 65 which have vertical swivel axes. By rotating the crank handle 61 to pull nut 53 and arm 50 upward into the housing 55, one corner of the frame A is raised off the floor. As soon as the weight of frame A and the boat is brought to bear on the wheel unit, frictional force holds the lower end 51 of arm 50 securely in the cross member 10 or 11 without requiring any fastening means. After all four corners of the frame A have been lifted a few inches off the floor, the frame and boat may be wheeled into the dealer's show room and placed in position for display.

Then the boat and frame A are lowered by cranks 61 until cross members 10 and 11 rest on the floor, allowing the wheel units C to be removed. The frame A supports the boat close to the floor in attractive display position and remains relatively inconspicuous, most of the frame being disposed underneath the boat. Frame A remains with the boat as a pallet until the boat is sold and launched.

If the boat is to be taken from the dealer's display room to a boat show, the wheel units C are attached and the boat is wheeled out to a highway cargo trailer or other means of transportation. Then the wheel units C are removed and the boat and frame A are loaded on the transportation vehicle by a lift truck fork F as shown in FIG. 3, or by a crane and sling or other means. At the boat show the boat and frame A are removed from the trailer as previously described and wheel units C are mounted on the four corners of frame A. Then the boat is wheeled to its display position and the wheel units C removed the same as described in moving the boat into the dealer's display room.

As previously mentioned, the frame A may be adapted to other types of objects to be transported, stored or put on display and the general operating procedure is the same as described above for handling a boat.

Having now described my invention and in what manner the same may be used, what I claim as new and desire to protect by Letters Patent is:

1. A wheel unit for detachable connection with a frame structure having outwardly directed horizontal tubular sockets, said unit comprising a rigid angular arm having a horizontal end portion and an upwardly extending opposite end portion, said horizontal end portion being adapted to slide into and out of said sockets, a jack housing surrounding and slidable upward and downward on said upwardly extending end portion of said arm, caster wheels on said jack housing for supporting said unit on a floor, and jack means in said housing for moving said upwardly extending portion of said arm relative to said housing for raising and lowering said horizontal end portion of said arm in a range of movement between substantially floor level and an elevated position.

2. A wheel unit as defined in claim 1 including rollers in said jack housing bearing against said upwardly extending end portion of said arm.

3. A wheel unit as defined in claim 1, said jack means comprising a nut in said arm and a screw in said nut having a bearing in said jack housing.

4. A wheel unit as defined in claim 1 including a pair of outstanding cross members on opposite sides of said jack housing, said wheels being mounted on said cross members.

5. A wheel unit as defined in claim 1, said upwardly extending end portion of said arm being disposed at an angle of approximately 135° with respect to said horizontal end portion.

* * * * *